US012770099B2

(12) United States Patent
Danescu et al.

(10) Patent No.: US 12,770,099 B2
(45) Date of Patent: Oct. 20, 2026

(54) WAREHOUSE MANAGEMENT SYSTEM AND A METHOD OF OPERATING SUCH A SYSTEM

(71) Applicant: DEXORY LIMITED, London (GB)

(72) Inventors: Andrei Danescu, London (GB); Adrian Negoita, London (GB)

(73) Assignee: DEXORY LIMITED (GB)

( * ) Notice: Subject to any disclaimer, the term of this patent is extended or adjusted under 35 U.S.C. 154(b) by 0 days.

(21) Appl. No.: 18/866,110

(22) PCT Filed: May 16, 2023

(86) PCT No.: PCT/GB2023/051280
§ 371 (c)(1),
(2) Date: Nov. 15, 2024

(87) PCT Pub. No.: WO2023/223013
PCT Pub. Date: Nov. 23, 2023

(65) Prior Publication Data
US 2025/0307761 A1 Oct. 2, 2025

(30) Foreign Application Priority Data
May 16, 2022 (GB) ...................................... 2207143

(51) Int. Cl.

| | |
|---|---|
| ***G06Q 10/087*** | (2023.01) |
| ***G06T 7/62*** | (2017.01) |
| ***H04N 13/204*** | (2018.01) |

(52) U.S. Cl.
CPC ............. *G06Q 10/087* (2013.01); *G06T 7/62* (2017.01); *H04N 13/204* (2018.05);
(Continued)

(58) Field of Classification Search
CPC ..... G06Q 10/087; G06T 7/62; G06T 2200/04; G06T 2207/10012; G06T 2207/3052; H04N 13/204
(Continued)

(56) References Cited

U.S. PATENT DOCUMENTS 6,119,933 A * 9/2000 Wong ..................... G06Q 20/14 902/27
2018/0029797 A1 2/2018 Hance et al.
2022/0388783 A1* 12/2022 Wintz .................. G06Q 10/087

FOREIGN PATENT DOCUMENTS

WO 2018038816 A1 3/2018
WO 2018057728 A1 3/2018

OTHER PUBLICATIONS

International Search Report and the Written Opinion of PCT/GB2023/051280, Issued Aug. 8, 2023.

* cited by examiner

*Primary Examiner* — Thai Q Tran
(74) *Attorney, Agent, or Firm* — The Belles Group, P.C.

(57) ABSTRACT

A warehouse management system and a method of using such a system are disclosed. A data gathering apparatus including lidar and visual image capture devices is attached to a vehicle such as a forklift. The data gathering apparatus gathers lidar and visual image data as it moves around a warehouse with storage locations such as shelves. The lidar and visual image data are processed to produce processed data in the form of a digital twin representing the storage area and accessible using a computer device to provide information about the storage locations and information about products stored on the shelves. In particular that information includes product information, visual images, percentage volume of the stored location filled and percentage of product present compared to a previous quantity.

8 Claims, 3 Drawing Sheets

(52) U.S. Cl.
CPC .................... *G06T 2200/04* (2013.01); *G06T 2207/10012* (2013.01); *G06T 2207/30252* (2013.01)

(58) Field of Classification Search
USPC ..................................................... 348/42, 46
See application file for complete search history.

WAREHOUSE MANAGEMENT SYSTEM AND A METHOD OF OPERATING SUCH A SYSTEM

CROSS-REFERENCE TO RELATED APPLICATIONS

This U.S. Non-Provisional Patent Application is a U.S. National Stage Application under 35 U.S.C. § 371 of Patent Cooperation Treaty (PCT) Application No. PCT/GB2023/051280, filed May 16, 2023, which claims priority to Great Britan Patent Application No. 2207143.5, filed on May 16, 2022, the entire disclosures of all of which are hereby incorporated by reference herein, for all purposes.

The present invention relates to a warehouse management system and method of operating such a system and relates particularly, but not exclusively, to a system for utilising the movement of vehicles, such as forklifts around a warehouse to gather data.

Warehouse management systems are commonly used to track and stock check the contents of a warehouse as part of a logistics operation. Such systems are important in order to keep track of the stock which is stored in the warehouse. This is required not only to ensure that the incoming and outgoing goods are logged but also to ensure that goods do not become misplaced within the warehouse. However, such systems rarely provide up-to-the-minute information. Furthermore, in a warehouse in which large quantities of the same goods arrive and are stored together but are picked for separate distribution the logging of the individual goods as they are picked and separated from the larger volume of those goods is not easily verified. If a pallet of goods arrives containing tens or hundreds of a particular item, traditional warehouse management systems rely on the number of items on that pallet having been accurately entered into the system. This in turn relies on the supplier of the goods accurately representing the number of items on the pallet. Inaccuracies in this number can present difficulties to the warehouse management system resulting in delays for the distribution of goods where a pallet becomes empty before the management system expects.

Preferred embodiments of the present invention seek to overcome or alleviate the above described disadvantages of the prior art.

According to an aspect of the present invention there is provided a method of using a warehouse management system comprising:

- providing a data gathering apparatus including lidar and visual image capture devices;
- causing said data gathering apparatus to move around a storage area having a plurality of storage locations therein and gathering lidar and visual image data while moving;
- processing said data to produce processed data in the form of a digital twin representing said storage area and accessible using a computer device to provide information about storage locations and information about products stored in said storage locations and in said storage area, wherein said information for that storage location including a plurality of product information, visual images, percentage volume of the stored location filled and percentage of product present compared to a previous quantity.

By gathering lidar and visual image data while moving around a warehouse and processing that data to produce a digital twin representing the warehouse, the advantage is provided that up-to-the-minute, almost live, information about a warehouse can be maintained in a warehouse management system. In particular, the combined data is able to produce useful analysis beyond that of a standard warehouse management system which indicates what items are stored at which locations. For example, data relating to the percentage of product still present at a storage location can be compared with the expected quantity based on the quantity arrived and the quantity which has been instructed to be picked from that location. Furthermore, the efficient and effective use of the warehouse can be monitored including ensuring that different space volumes at different storage locations are utilised effectively (large items being stored in large spaces and small items being stored in small spaces). Similarly, if identical products are stored in different locations it can be ensured that the picking of those articles efficiently utilises the warehouse space (two pallets which are more than half empty can reflect ineffective use of warehouse space).

By operating this method across multiple devices working in parallel in a warehouse it is possible to cover the entire warehouse quicker performing the operations in a distributed way across the fleet. This ensures that the digital twin is in its most up to date form. The digital twin platform can aggregate the data and bring the information from multiple sources together in a single platform, making it available to the entire company, not single warehouse only.

In a preferred embodiment the data gathering apparatus is attached to a warehouse vehicle and caused to move by the movement of that vehicle.

Using warehouse vehicles, such as forklift trucks, utilises the movement of devices around a warehouse.

In another preferred embodiment the visual capture device comprises a 3D camera.

The method may further comprise scanning products to determine a volume occupied by said products prior to being placed in said storage locations.

By scanning a pallet of products on arrival at a warehouse this improves the accuracy of the determination of metrics such as the percentage volume of the stored product compared to the original volume. Since products are picked from the front of a pallet of goods and this is the face which is scanned by the apparatus passing along the aisles of the warehouse between storage racks of storage locations this means that unusual shapes of pallets of goods (those that do not stacked neatly into cuboids) can still be accommodated within the percentage number of stored products.

The method may also further comprise communicating at least some of said processed data to another warehouse management system.

According to another aspect of the present invention there is provided a warehouse management system comprising:

- at least one data gathering apparatus including lidar and visual image capture devices movable around a storage area having a plurality of storage locations therein for gathering lidar and visual image data while moving;
- at least one processor for processing said data to produce processed data in the form of a digital twin representing said storage area and accessible using a computer device to provide information about storage locations and information about products stored in said storage locations and in said storage area, wherein said information for that storage location including a plurality of product information, visual images, percentage volume of the stored location filled and percentage of product present compared to a previous quantity.

In a preferred embodiment the data gathering apparatus is attached to a warehouse vehicle and caused to move by the movement of that vehicle.

In another preferred embodiment the visual capture device comprises a 3D camera.

Preferred embodiments of the present invention will now be described, by way of example only, and not in any limitative sense with reference to the accompanying drawings in which:—

Figure 1:
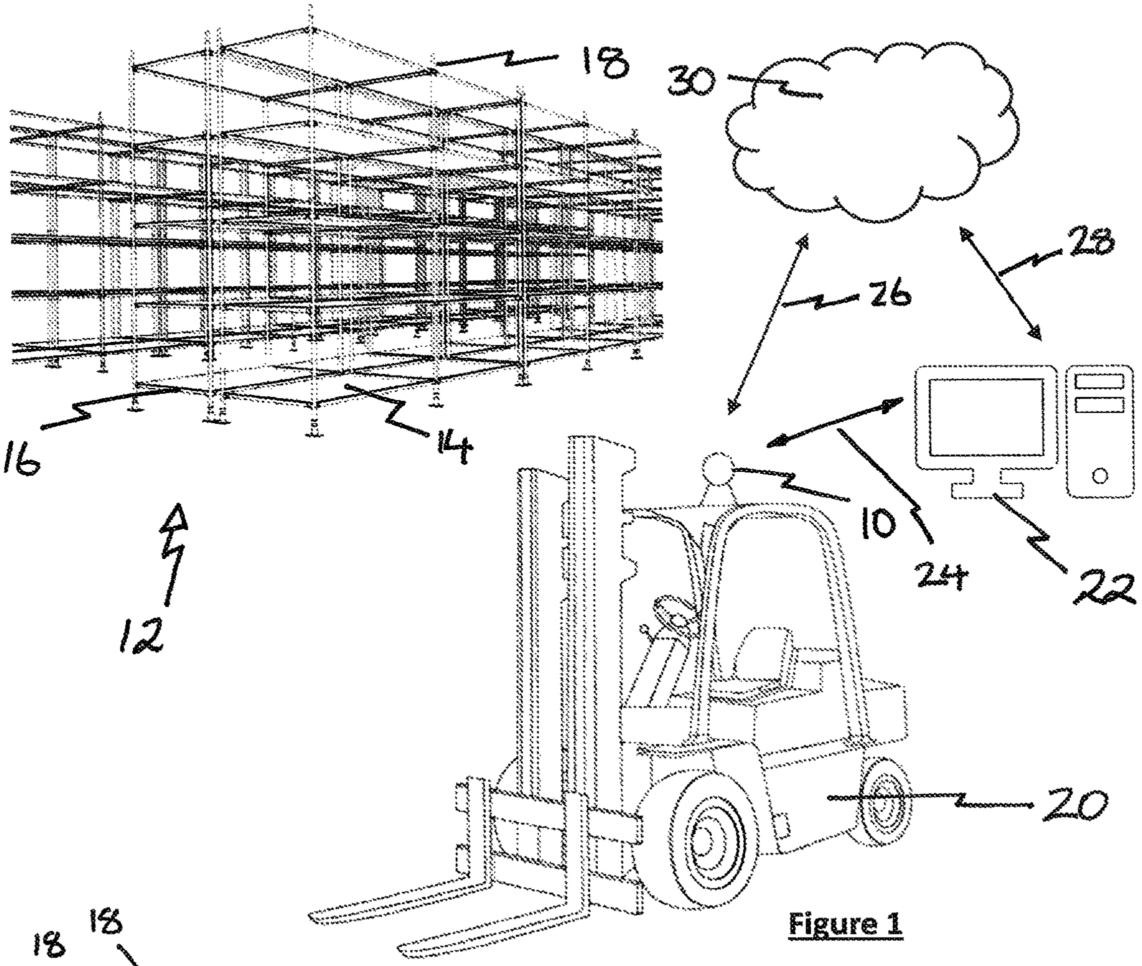
FIG. 1 is a schematic representation of the system of the present invention.

Referring initially to FIG. 1, a data gathering device 10 is provided to gather data relating to a storage area, such as a warehouse 12, which includes a plurality and generally a multiplicity of storage locations 14 on the shelves 16 of storage racks 18. The data gathering apparatus is ideally, although not necessarily, a single unit which includes at least one lidar device and at least one visual camera. The data gathering apparatus 10 may also include other sensors, including, but not limited to, RFID readers, motion sensors such as accelerometers and other environmental monitoring sensors measuring parameters including, but not limited to, temperature, humidity, light intensity and noise levels. Sensors can also be provided to measure any of various gas levels, such as VOCs, in particular where chemicals are being stored and to measure other quality of air or pollution factors. Radio frequency levels can also be measured around the warehouse in particular in the 2.4 to 5 GHz range.

The data gathering device 10 is mounted on a device which enables the apparatus 10 to move around the warehouse 12. In the example shown in FIG. 1 the data gathering apparatus 10 is mounted on a forklift truck 20. The data gathering apparatus may alternatively be mounted on and moved around the warehouse by other devices, including, but not limited to, other vehicles, robots, both autonomous and controlled, drones, and mounted on backpacks or other items which may be carried by personnel walking around the warehouse. However, it is preferable for the data gathering apparatus to be mounted on a vehicle or the like which is already operating within the warehouse 12 and is therefore not adding to the traffic and creating obstacles within the aisles between the racks 18.

The data gathering apparatus 10 also includes a processor and transmitter which enable the apparatus to undertake processing of the data as well as transmission of the processed and raw data to a computer device 22, either directly (indicated by arrow 24) or indirectly (indicated by arrows 26 and 28) via server storage (indicated schematically at 30).

Operation of the system of the present invention will now be described with additional reference to the remaining figures. A forklift truck 22 has a data gathering apparatus 10 mounted thereon and the vehicle operates in its normal manner, moving around a warehouse 12 taking items or products loaded onto a pallet and placing them in storage locations 14 on shelves 16 of racks 18 or on the floor below the racks 18. As the forklift 20 moves around the warehouse, the data gathering apparatus 10 gathers lidar and visual image data. The data gathering apparatus 10 can be programmed so as to continuously gather data or alternatively can periodically gather data when not moving and continuously gather data when the vehicle 20 is in motion, as determined by accelerometers located in the apparatus 10. The data gathering apparatus 10 is preferably able to gather data in all directions around 360° for both the lidar and visual image data being gathered.

The lidar data represents distances from the data gathering apparatus 10 to objects within the field-of-view of the apparatus. This data is used to create a 3D point cloud representation of the warehouse 12 and its contents, including the racks 18 and the articles or products stored in the multiplicity of storage locations 14. The apparatus is simultaneously gathering visual image data. Any form of such visual image data is suitable and this can include simple standard images taken from one or more directions from the apparatus 10. It can also include 360° images and is most preferably taken using 3D visual cameras or stereo vision systems in addition to the lidar and monocular camera modules. This is particularly useful as the 3D images can be used in conjunction with the lidar data to assist in the interpretation of that data to produce the most accurate representation of the structures within the warehouse. In this context, the term structures is used to include immovable or practically immovable aspects of the warehouse, such as external walls, floors, ceilings, fittings such as light fittings and walkways, as well as the shelving racks 18. The data is also used to interpret the non-permanent fixtures such as the products that are stored on the shelves 16 of the racks 18 in the storage locations 14 and the objects which are not of interest as part of the warehouse management system such as the movable and moving things within the warehouse 12, like other warehouse vehicles and people moving around the warehouse.

The visual data is also used to identify items or products which are stored on the racks 18 in the storage locations 14. For example, individual products may be provided with visually readable data such as barcodes, QR codes, readable alphanumeric codes and readable words. Such readable codes and materials may be identified on individual articles or may be associated with a group of articles by being attached to a pallet on which the articles are located. Alternatively, the product identity data can be stored on RFID tags and read by an RFID reader mounted on the apparatus 10. The processed data can therefore identify the article or articles which are stored in a particular location and allocate those articles to that location within the warehouse management system.

A particularly important function of the present invention is to provide continuous monitoring of the contents of the warehouse. In a large warehouse it is commonplace for multiple forklift trucks to be operating. If each of those trucks 20 is provided with a data gathering apparatus 10 and each of those apparatus are continually gathering data while the forklift is moving then a large quantity of data relating to the warehouse can be generated. As a result, the warehouse management system can be provided with data which is accurately representing the contents of the warehouse with live or up to the minute or at least very close to up-to-the-minute accuracy. For example, as a forklift receives a new palette of products as they arrive into the warehouse, the forklift takes that pallet to one of the storage locations. As the forklift approaches the pallet the cameras in the data gathering apparatus 10 produce image data relating to that pallet and these images can be interpreted to determine the products located on the pallet using barcodes or the like as previously described. The lidar of the data gathering apparatus 10 is also able to generate data relating to the volume of the pallet and the products thereon. This is more preferably achieved by a scanning process which can involve the forklift traversing a circular path around the pallet or by some other pallet scanning process. However, even without a formal scanning process significant volume information can be inferred from the lidar data gathered as the forklift approaches the pallet. This volume information can be used to determine what is the most suitable place to locate the pallet to efficiently utilise the space within the warehouse. For example, some storage locations allow larger volumes to be stored whereas others are only suitable for smaller heights of products on pallets.

Once a pallet is in position the goods on that pallet are often picked by warehouse staff for redistribution. As the forklift trucks 20 continue to operate around the warehouse and are continually using their lidar and visual image data gathering apparatus the decreasing volume of products located on that pallet can be determined. This in turn allows a rate of product used to be estimated which allows an estimate of the time at which the pallet will be depleted of all stock to be made. It is also possible to use this data to cross-reference with other aspects of this or another warehouse management system which instruct pickers to a pallet which is generally provided with a known number of articles located thereon. This information is generally provided to the warehouse management system on the arrival of the product from a supplier. However, if this quantity data is incorrect this can lead to significant difficulties within the warehouse because the warehouse management system is instructing pickers to retrieve products from a location where no product is present. By maintaining a live or near live estimation of the volume of products located in any storage location this can be cross-referenced with the existing data to ensure that it is accurate in case of inaccurate entry of the number of product or to identify the suspected theft of items. Where the system utilises multiple devices working in parallel on multiple vehicles (or drones or carried on backpacks) the entire warehouse is monitored quickly by performing the operations in a distributed way across the fleet of vehicles already operating in the warehouse. Therefore, the data represents a digital twin, a digitally accessible version of the warehouse, which is used to monitor the goods within the warehouse. The digital twin platform aggregates the data and bring the information from multiple sources together in a single platform, making it available to the entire company, not single warehouse only. As well a mapping the locations of items within the warehouse, the other data gathered such as temperature, humidity, light intensity, noise levels and other environmental variables such pollution and gas levels, can be mapped onto the digital twin. These additional map layers being added to the digital twin enable a more accurate picture of the warehouse environment to be built ensuring optimum or necessary storage conditions are maintained throughout the warehouse building a more complete picture than is possible with a number of static sensors. It also helps to keep a tight control on energy usage in the warehouse and enables a continuous real time audit of warehouse conditions to be maintained. The monitoring and scanning of radio frequencies enable communication blackspots to be identified ensuring items such as handheld scanner work throughout the warehouse at all times.

Figure 2:
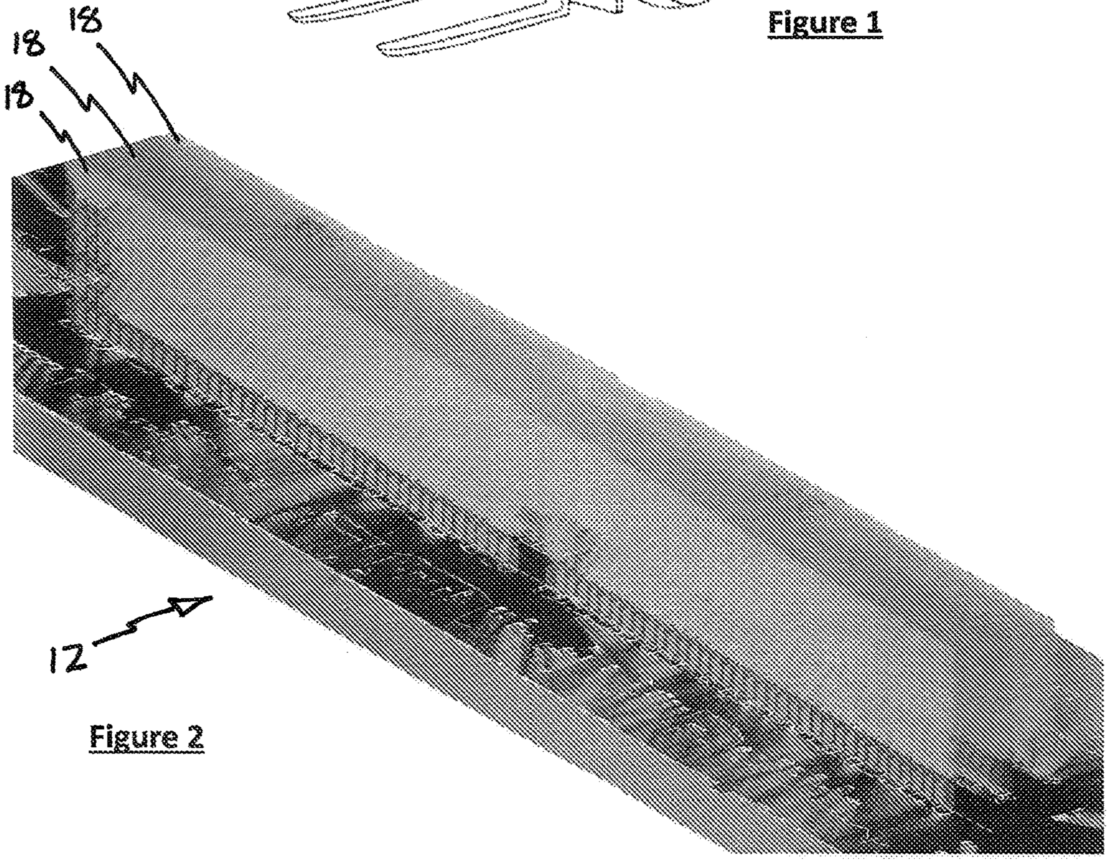
FIG. 2 is a digital representation of a storage area displayed on a computer device using the system of the present invention.
Figure 3:
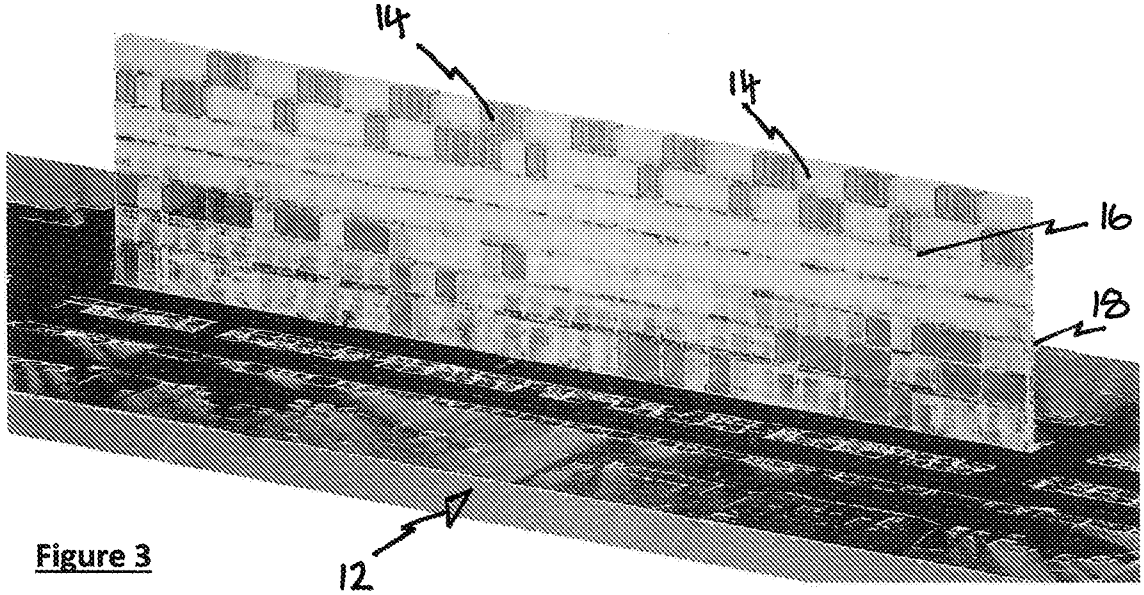
FIG. 3 is an image of a visual representation of the processed data gathered using the system of the present invention.
Figure 4:
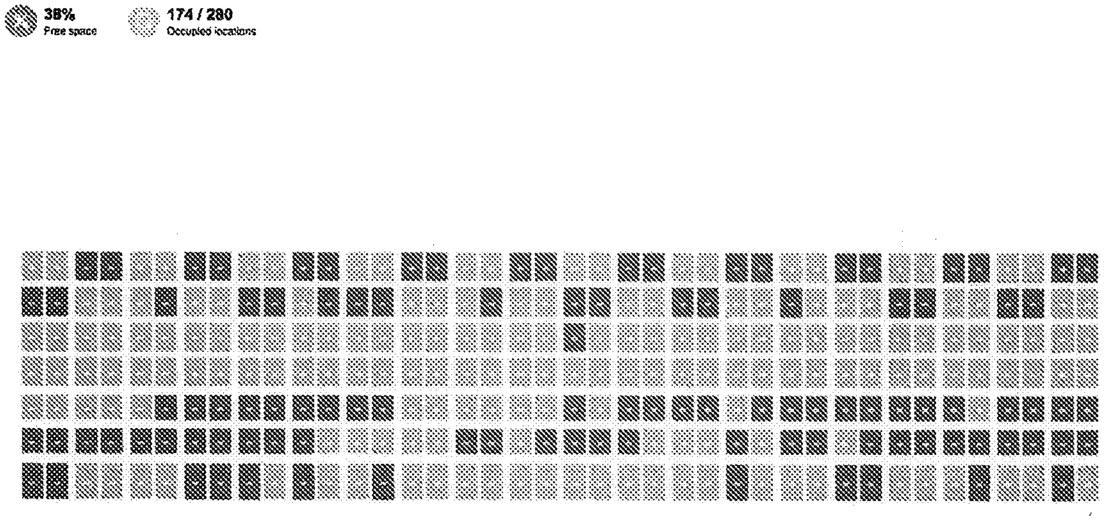
FIG. 4 is an alternative visual representation of the processed data gathered using the system of the present invention.
Figure 5:
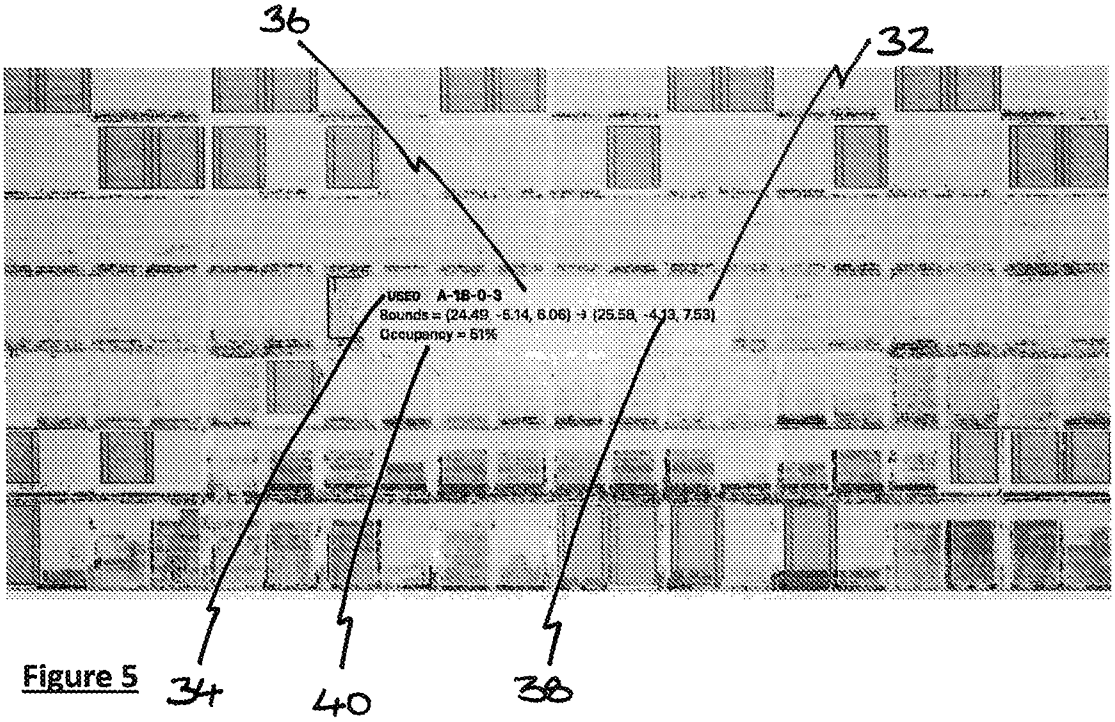
FIGS. 5 and 6 are close-up portions of the visual representation of FIG. 3 as displayed on a computer device.
Figure 6:
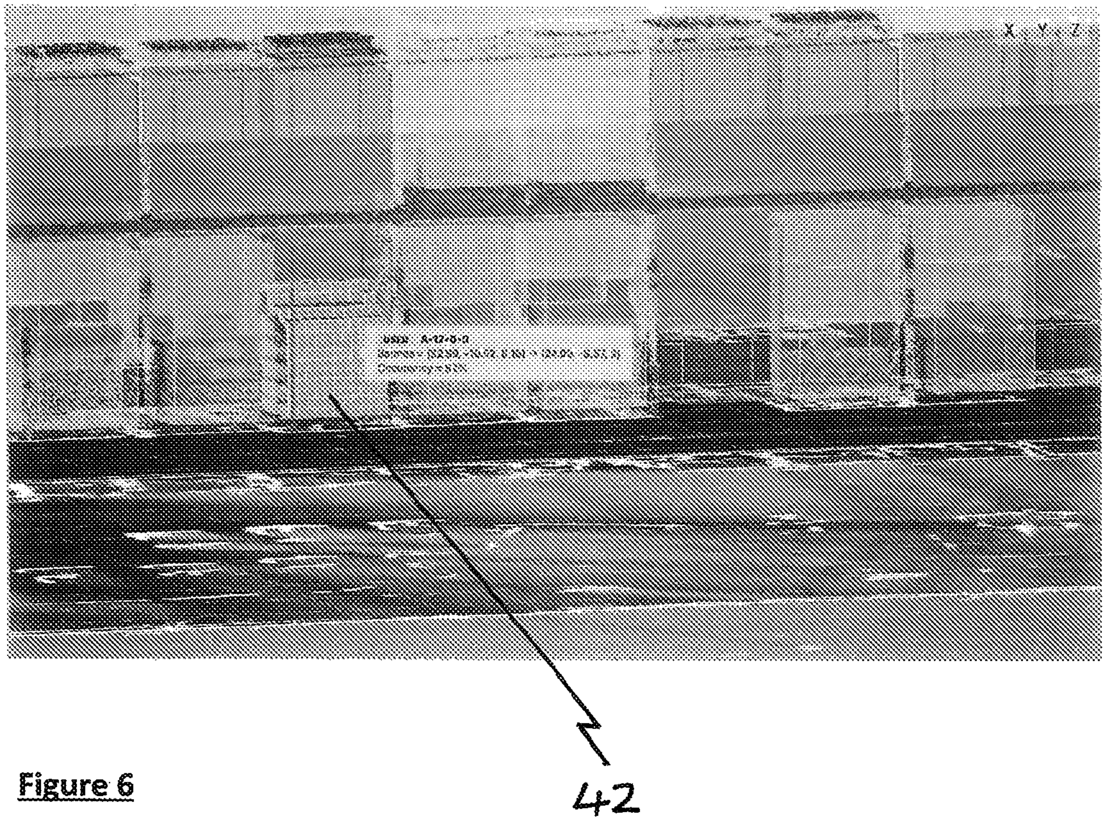

As part of the warehouse management system, a display is generated on a computer device providing easily accessible information about each storage location within the warehouse. Examples of these displays are shown in FIGS. 4, 5 and 6. The data includes, but is not limited to a plurality of product information, visual images, percentage volume of the stored location filled and percentage of product present compared to a previous quantity. FIG. 4 shows a simplified representation of a storage rack in which the status of the storage locations is indicated using contrasting colours. Typically, the colours red and green are used with red representing occupied storage locations (containing goods) and green representing empty storage locations. In the black and white image of FIG. 4 the lighter shade of grey are the red occupied locations and the darker shade are the green empty locations. This visual representation is accompanied by numeric data including the number of occupied locations as a ratio of the total locations and a percentage of empty space. In FIGS. 5 and 6 the images are generated from the 3D point cloud data which has been gathered by the lidar device and combined with visual image data together with interpreted data to produce more realistic representations of the storage locations. An overview of this data for a single rack is shown in FIG. 3 and an overview of multiple racks together forming all or part of a warehouse is shown in FIG. 2. Initial interaction with the warehouse management system starts with an overview of the warehouse as shown in FIG. 2 and selection of a rack of interest produces the image from FIG. 3. Standard image navigation techniques are used to create the images on screen seen in FIGS. 5 and 6 and upon selection of one of the storage areas, as visually represented, produces the displayed data 32 which includes an indication, at 34, as to whether the storage location 14 is occupied or empty ("used" equals occupied). Also displayed at 36 is a storage location code as used by the warehouse staff. The bounds information (that is the size of the space), indicated at 38, and the percentage occupancy, indicated at 40, for that storage location is also displayed. With particular reference to FIG. 6, it can be seen that when the image is zoomed in even closer it is possible to see the representation of the 3D point cloud data as a visualisation of the product remaining on the pallet, for example the storage location indicated at 42. Furthermore, an example of a visual image of the particular storage location of interest can be displayed, this image having been extracted from the visual image data gathered. If more information is required, a history of visual images can be displayed and linked together to generate a time-lapse video of that storage location.

It will be appreciated by persons skilled in the art that the above embodiments have been described by way of example only and not in any limitative sense, and that various alterations and modifications are possible without departure from the scope of the protection which is defined by the appended claims. The processing of the data gathered by the data gathering apparatus may take place on the data gathering apparatus prior to transmission, may take place on a server or dedicated computer after transmission or both.

The invention claimed is:

1. A method of using a warehouse management system comprising:

providing a data gathering apparatus including lidar and visual image capture devices;

causing said data gathering apparatus to move around a storage area having a plurality of storage locations therein and gathering lidar data and visual image data while moving; and processing said lidar data and said visual image data to produce processed data in the form of a digital twin representing said storage area and accessible using a computer device to provide information about respective ones of said storage locations and information about products stored in said storage locations and in said storage area, wherein said information for a respective one of said storage locations comprises product information, visual images of the respective one of said storage locations, a percentage of a volume of the respective one of said storage locations that is filled, and a percentage representing a current quantity of product present at the respective one of said storage locations compared to a previous quantity of product present at the respective one of said storage locations at an earlier time.

2. A method according to claim 1, wherein said data gathering apparatus is attached to a warehouse vehicle and caused to move by the movement of that vehicle.

3. A method according to claim 1, wherein at least one of said visual image capture devices comprises a 3D camera.

4. A method according to claim 1, further comprising scanning products to determine a volume occupied by said products prior to being placed in said storage locations.

5. A method according to claim 1, further comprising communicating at least some of said processed data to another warehouse management system.

6. A warehouse management system comprising:

at least one data gathering apparatus including lidar and visual image capture devices, said at least one data gathering apparatus being movable around a storage area having a plurality of storage locations therein for gathering lidar data and visual image data while moving; and at least one processor for processing said lidar data and said visual image data to produce processed data in the form of a digital twin representing said storage area and accessible using a computer device to provide information about respective ones of said storage locations and information about products stored in said storage locations and in said storage area, wherein said information for a respective one of said storage locations comprises product information, visual images of the respective one of said storage locations, a percentage of a volume of the respective one of said storage locations that is filled, and a percentage representing a current quantity of product present at the respective one of said storage locations compared to a previous quantity of product present at the respective one of said storage locations at an earlier time.

7. A warehouse management system according to claim 6, wherein said data gathering apparatus is attached to a warehouse vehicle and caused to move by the movement of that vehicle.

8. A warehouse management system according to claim 6, wherein at least one of said visual image capture devices comprises a 3D camera.

* * * * *